Feb. 16, 1954 M. E. WOOD 2,669,399
FISHING REEL ARBOR
Filed April 14, 1951 3 Sheets-Sheet 1
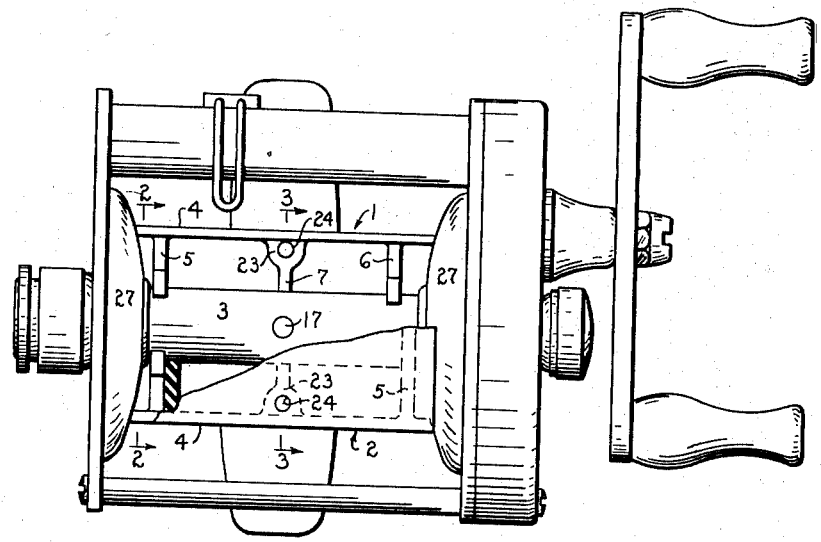
Fig.-1
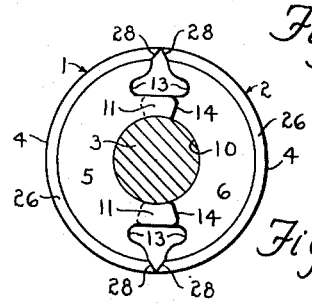
Fig.-2
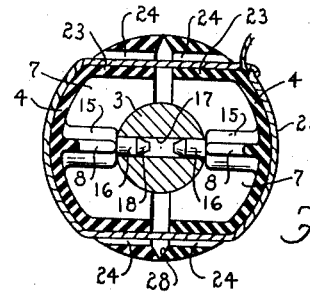
Fig.-3
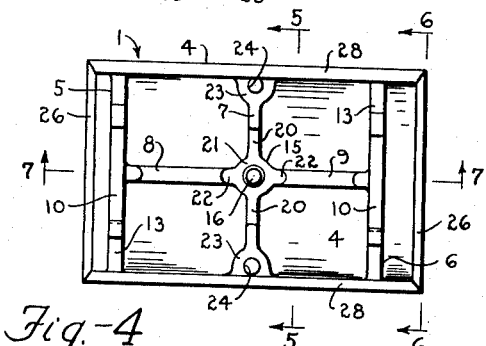
Fig.-4
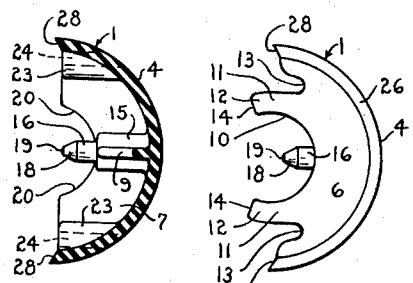
Fig.-5
Fig.-6
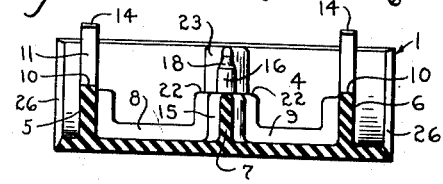
Fig.-7
INVENTOR.
MORRIS E. WOOD
BY
Charles S. Penfold
ATTORNEY

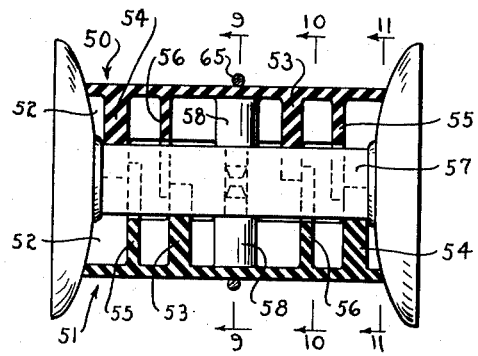
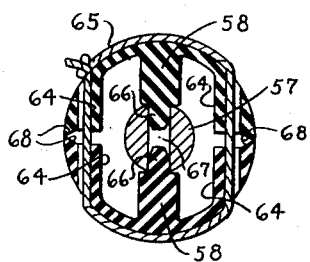 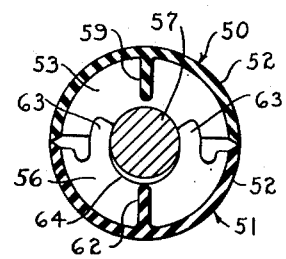 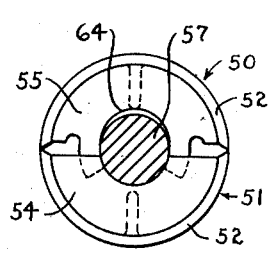
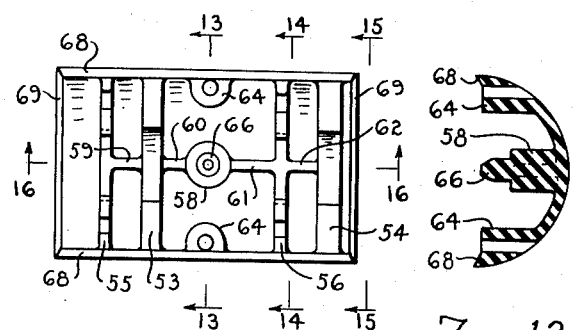 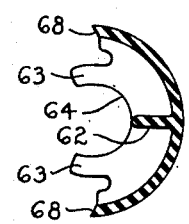 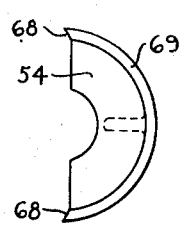
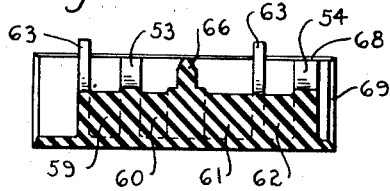

Feb. 16, 1954

M. E. WOOD 2,669,399

FISHING REEL ARBOR

Filed April 14, 1951

INVENTOR.
MORRIS E. WOOD
BY
Charles S. Penfold
ATTORNEY

Patented Feb. 16, 1954

2,669,399

UNITED STATES PATENT OFFICE 2,669,399

FISHING REEL ARBOR

Morris E. Wood, Bronson, Mich., assignor to Higbie Manufacturing Company, a corporation of Michigan Application April 14, 1951, Serial No. 221,003

53 Claims. (Cl. 242—125)

This invention relates generally to fishing tackle, and more particularly is directed to an accessory or arbor fitting adapted for association with the spool shaft of a fishing reel.

This application is a continuation-in-part of my copending application, Serial Number 57,653, filed November 1, 1948 now abandoned.

In certain types of casting reels the diameter of the cylindrical line supporting surface is appreciably increased by permanently securing an arbor or drum to the spool, in order that less line may be used to advantage. Due to the fact that the arbor in effect increases the diameter of the shaft, the convolutions of the line will be correspondingly increased to a substantially uniform diameter without resorting to a back fill of line. As a result, the line will not only play out uniformly and smoothly at a faster speed when a cast is made but can be reeled in at a faster rate with less effort, thereby promoting the performance and usefulness of the reel.

When such an arbor constitutes an original permanent component part of the reel assembly the spool is in balance. However, if removed, it becomes damaged and if reassembled the spool generally becomes unbalanced. It is also usually difficult to reanchor or affix such an arbor against relative movement with respect to the spool.

The subject invention contemplates the utilization of an arbor which is adapted to be detachably connected to a conventional shaft or line supporting means in order to facilitate and expedite the proper delivery and return of the line, particularly while casting. Thus, the owner of a conventional reel may promote its efficiency by the simple expedient of attaching thereto the arbor embodying the improved principles of design and construction of the subject invention.

One of the principal objects of the invention is to provide an arbor preferably comprised of a minimum number of corresponding sections or parts which can be easily and quickly assembled and disassembled with respect to the spool an unlimited number of times.

An important object of the invention is to provide an arbor of the character just referred to, in which at least one of the sections includes a plurality of shaft-bearing supports provided with integral yieldable or resilient holding or locking means designed and constructed whereby such section can be snapped onto the shaft for rotation with the spool.

A significant object of the invention is to provide an arbor comprised of corresponding sections, in which the yieldable or resilient locking means and shaft-bearing supports above referred to may be formed so that they are independent of one another; in other words, it is not essential that the resilient locking means be integral with the bearing supports.

Of further significance is the fact that the invention also contemplates a construction in which each of the arbor sections is provided with rigid locking means and so formed that its outer curved line supporting wall may yield or flex to enable the section to be snapped onto a spool shaft. The invention is susceptible of various constructions and all of those disclosed herein provide an arrangement whereby portions of the arbor sections embrace or connect with a shaft or spool as distinguished from an arrangement in which portions of sections interlock with one another to secure a connection with a spool or shaft thereof. It is to be understood that insofar as the subject invention is concerned the arbor sections may also provide a support for film, tape or other line material.

A particular object of the invention is to provide an arbor in which at least one of the sections is provided with an integral projection adapted for disposition in the transverse line receiving aperture in a conventional shaft for the purpose of keying the arbor thereto for rotation with the spool.

Another object of the invention is to provide the arbor sections with pairs of apertures so arranged that when a line is passed therethrough and about the arbor the line will tend to maintain the arbor sections in assembly.

A further object of the invention is to design and construct the sections so they will cooperate with each other and the flanges of the spool in such a manner that the arbor provides a firm cylindrical support for the line, and the line is prevented from being caught between the end extremities of the sections and the inner convex surfaces of the spool flanges.

Additional objects or attributes of the invention reside in its simplicity, durability, light weight, and low cost of manufacture.

Other objects and advantages of the invention will become evident after considering the description hereinafter set forth in conjunction with the drawing annexed hereto.

In the drawing:

Figures 1 through 7 exemplify one embodiment of the invention, in which bearings formed on the arbor sections are provided with integral yieldable locking means connectible with a spool shaft;

Figure 1 is a front view of a conventional reel showing the arbor embodying the invention applied thereto, with portions of the arbor broken away for the purpose of illustrating its operative relationship with the spool;

Figure 2 is an enlarged transverse section taken substantially on line 2—2 of Figure 1;

Figure 3 is an enlarged transverse section taken substantially on line 3—3 of Figure 1 depicting the manner of keying the arbor sections to the shaft, and mode of connecting a fish line to such sections;

Figure 4 is an enlarged inside view of one of the arbor sections;

Figure 5 is a transverse section taken substantially on line 5—5 of Figure 4;

Figure 6 is an end view of one of the corresponding arbor sections looking in the direction of line 6—6 in Figure 4;

Figure 7 is a longitudinal section of an arbor section taken substantially on line 7—7 of Figure 4;

Figure 17:
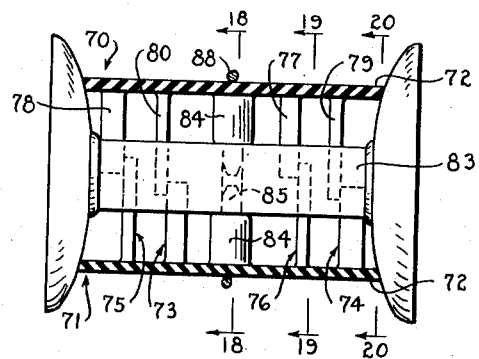
Figure 18:
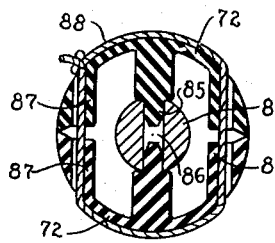
Figure 19:
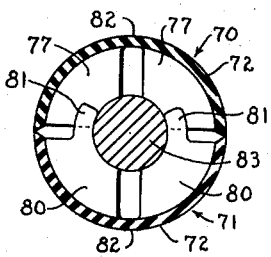
Figure 20:
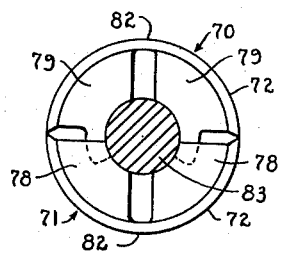
Figure 21:
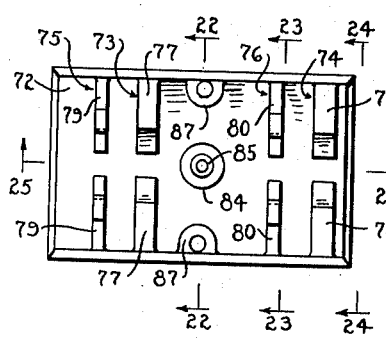
Figures 22, 23:
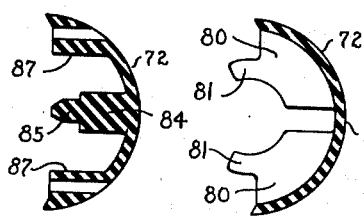
Figure 24:
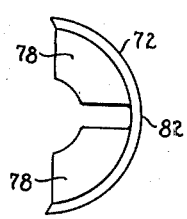
Figure 25:
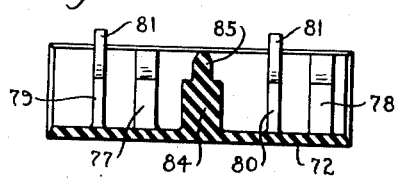

Figures 8 through 16 exemplify a second embodiment of the invention, in which the arbor sections are provided with bearings and yieldable locking means independent of the bearings for connection with a spool;

Figure 8 is a front view of a conventional reel spool similar to Figure 1, showing, among other things, the longitudinal spaced relationship of the bearings and yieldable locking means;

Figures 9, 10 and 11 are transverse sectional views taken substantially on lines 9—9, 10—10 and 11—11 of Figure 8, respectively;

Figure 12 is an enlarged inside view of one of the arbor sections shown in Figure 8;

Figures 13, 14 and 15 are transverse sectional views taken substantially on lines 13—13, 14—14 and 15—15 of Figure 12;

Figure 16 is a longitudinal sectional view of one of the arbor sections taken substantially on line 16—16 of Figure 12;

Figures 17 through 25 exemplify a third embodiment of the invention, in which the bearings and resilient locking means are made rigid and independent of one another and the curved line or material supporting wall of each arbor is constructed to yield, thereby affording an arrangement enabling the locking means to snap into detachable connection with a spool;

Figure 17 is a front view of a conventional reel spool, similar to Figures 1 and 8, showing, among other things, the operative relationship of the bearings, locking means and the spool shaft;

Figures 18, 19 and 20 are transverse sectional views taken substantially on lines 18—18, 19—19 and 20—20 of Figure 17, respectively;

Figure 21 is an enlarged inside view of one of the arbor sections shown in Figure 17;

Figures 22, 23 and 24 are transverse sectional views taken substantially on lines 22—22, 23—23 and 24—24 of Figure 21, respectively; and Figure 25 is a longitudinal sectional view taken substantially on line 25—25 of Figure 21, all of said sectional views illustrating details of design and construction.

The embodiment of the invention depicted in Figures 1 through 7 of the drawing will be described first.

The arbor embodying the improved principles of design and construction of the subject invention exemplified in the drawing is preferably comprised of two sections 1 and 2, substantially identical in character and constructed of some desirable material impervious to water, such as moulded plastic having properties suitable for the purposes above described.

Each of the arbor sections is preferably made in the form of a shell substantially semi-cylindrical in character. These sections when assembled on a conventional shaft 3 of a fishing reel spool provide a firm cylindrical support for the line. More specifically each section includes, among other things, a semi-cylindrical line supporting wall 4 of uniform thickness, a pair of corresponding transverse or radial shaft engaging bearings 5 and 6 disposed adjacent the end extremities of the section and unequal distances from a center radial bearing 7. These shaft engaging bearings are integrally connected to the wall 4 and stabilized by a pair of longitudinally medial webs 8 and 9 to impart substantial rigidity to the sections.

The end bearings 5 and 6 are each provided with an arcuate shaft bearing surface 10 and a pair of adjacent yieldable or flexible finger portions 11, the intervening space between the extremities 12 of each pair of fingers being slightly less than the diameter of the spool shaft as well as the diameter of an arcuate surface 10 so that the arbor sections may be readily snapped into holding relation to the shaft. Yieldability of the fingers is obtained in some measure by the formation of interruptions or notches 13 provided in the bearings. The fingers preferably extend beyond a plane formed by the longitudinal marginal edges of the sections, and their extremities 12 are provided with surfaces 14 whereby to assist in piloting the shaft into seating relationship with the arcuate bearing surfaces. The fingers have proven very efficient and durable, due in part to the fact that their flexation or movement is in the plane of their width. These fingers and the arcuate bearing surfaces in effect constitute bifurcations adapted to embrace the shaft.

The center radial bearing 7 is preferably formed with an intermediate enlarged generally cylindrical radial portion 15 from which extends an integral radial projection 16. Each projection is of a cross-sectional size somewhat less than that of portion 15, and is adapted for disposition in one end of a line receiving aperture 17 in the spool shaft as exemplified in Figure 3 whereby to key the arbor sections to the shaft for rotation with the spool. The size of the projections and hole are such that a snug fit is established therebetween in order to prevent any lost motion or relative rotational movement between the arbor sections and shaft. The outer end of each projection is preferably provided with a frusto-conical portion 18 and a pointed portion 19 whereby to assist in piloting the projection into the aperture. The bearing 7 is provided with arcuate shaft bearing surfaces 20. The material adjacent the end of cylindrical portion 15 about the base of the projection 16 is formed to provide an annular shaft bearing surface 21. The inner extremities of the webs 7 and 8 which are joined to portion 15 also provide additional or supplemental shaft bearing surfaces 22. If found desirable, the outer extremities of the webs may be formed to present bearing surfaces similar to the surfaces 22. With this unique arrangement, the bearing surfaces referred to are well distributed for balance and stability.

Any suitable means may be provided for attaching the fish line to the arbor, but as herein illustrated, this is preferably accomplished by forming an enlargement 23 adjacent each end of the center bearing 7, which enlargement joins portions of this bearing to the cylindrical wall 4. An aperture 24 extends through each enlargement in a general chordal direction, or substantially parallel to the longitudinal axis of projection 16 and associated cylindrical portion 15. When the arbor sections are properly mounted on the spool the apertures 24 in one section are aligned with the apertures in the other section so that a line 25 may be threaded therethrough and about the sections and tied as depicted in Figure 3; and thereby assist, in some measure, to maintain the sections assembled. Obviously, it is not essential that the line be passed through both pairs of aligned apertures to secure the line about the arbor sections.

As clearly exemplified in the drawings, the end margins of the arbor sections are preferably beveled as indicated at 26 so that they will intimately engage the convex surfaces of the spool flanges 27. The longitudinal marginal edges of the sections are also preferably beveled as indicated at 28 so as to insure longitudinal engagement only adjacent the peripheral surfaces of the arbor sections. Such an arrangement serves to provide a stable support for the line, and at the same time will prevent the line from receding and becoming caught between the extremities of the sections and spool flanges.

The longitudinal spacings between the end bearings 5 and 6 with respect to the center bearing 7 and the end extremities of the arbor sections are such that when the sections are properly mounted on the shaft, the end bearings 5 and 6 on one section will be juxtaposed relative to the end bearings 6 and 5 on the other section, respectively. Otherwise expressed, the end bearing 5 on one section is more or less arranged in overlapping relationship with respect to the end bearing 6 of the other section, and the same is true of the other end bearings. It will be noted that the center radial bearings 7 coincide.

In view of the foregoing description, it will be apparent that the arbor sections can be easily and quickly assembled with the spool shaft by merely arranging them as set forth above so that the surfaces 14 on the locking fingers 11 engage the shaft and the projections 16 are disposed opposite the line receiving aperture 17, whereupon appropriate manual pressure will cause the surfaces 14 to cam and spread the fingers apart a distance substantially corresponding to the diameter of the shaft after which the fingers will automatically retract and snap into embracing position on the shaft to place the various bearing surfaces on the sections in engagement with the shaft and the projections 16 in the aperture 17. It is of course to be understood, that the sections may be connected consecutively to the shaft. With this unique locking arrangement, the sections can be readily attached without the use of a plurality separate, easy-to-lose parts, or application of tools for connecting the arbor to the shaft. In other words, the arbor embodying the subject invention is comprised solely of two substantially identical parts, and the design and construction are such that the method of attaching same to the shaft is obvious. This is an important factor as it reduces considerably the cost of assembly in the factory, and facilitates assembly at the place of use. Moreover, since the arbor is constructed of an impervious material such as plastic, the overall weight of the reel is not materially increased, and any question of rust or corrosion are entirely eliminated.

The second embodiment of the invention illustrated in Figures 8 through 16 of the drawing will now be described. In this embodiment the arbor is comprised of a pair of sections 50 and 51 provided with bearings and resilient locking means which constitute separate components that are not integral with one another as in the first embodiment. Aside from these primary distinctions, the sections 50 and 51 are identical and generally correspond in size and shape with arbor sections 1 and 2.

More particularly, each of the arbor sections 50 and 51 includes a semi-cylindrical line supporting wall 52 of substantially uniform thickness, a pair of corresponding transverse radial bearings 53 and 54 and a pair of corresponding radial locking means 55 and 56 for engaging the shaft 57 of a spool as clearly shown in Figures 8, 10 and 11. The bearings and locking means are spaced apart longitudinally from one another and unequal distances from a center cylindrical radial portion or bearing 58 so that when the arbor sections are applied to a spool in reversed positions, the bearings and locking means will assume a side-by-side relationship to provide a well-balanced substantial arbor assembly as depicted in Figure 8. The bearing 53 and locking means 55 are located on one side of the center portion 58 with the bearing arranged between the center portion and locking means, whereas the bearing 54 and locking means 56 are located on the other side of the center portion with the locking means between the center portion and bearing. The locking means 55 and bearing 53 are preferably joined and reenforced by a longitudinal web 59; the bearing 53 and portion 58 by a web 60, the portion 58 and locking means 56 by a web 61, and the locking means 56 and bearing 54 by a web 62 as shown in Figures 12 and 16. These webs lend stability to each arbor section and are preferably so formed that they do not engage the shaft 57 as shown in Figure 8.

Each of the locking means 55 and 56 is provided with a pair of resilient or flexible holding portions preferably in the form of fingers 63 which substantially correspond in size and shape with the locking portions or fingers of the first embodiment of the invention. It will be noted, however, that the material between the fingers 63 is inset as indicated at 64 to provide clearance so that such material does not constitute a bearing as in the first embodiment. In other words, only the fingers 63 resiliently embrace and engage the shaft to pull the arbor section toward the shaft so that the arcuate bearing surfaces of the bearings 54 and 55 spaced axially from the fingers will continuously bear against the shaft.

Each of the arbor sections 50 and 51 is also provided with tubular enlargements 64 through which a line 65 may be extended as shown in Figure 9. Each of the center portions 58 is provided with a frusto-conical projection 66 which fits in a conventional line receiving aperture 67 of the shaft as shown in Figures 8 and 9. The longitudinal marginal edges 68 and the end marginal edges 69 of each section are bevelled. These enlargements, projections and marginal edges substantially correspond in character and use to those described in the first embodiment of the invention.

The third embodiment of the invention exemplified in Figures 17 through 25 of the drawing will now be described. The arbor of this embodiment is comprised of sections 70 and 71 which bear a somewhat closer resemblance to the arbor sections of the second embodiment than those of the first embodiment. The sections 70 and 71 are identical and each includes a semi-cylindrical wall 72 of substantially uniform thickness provided with radial bearings generally designated 73 and 74 and locking means generally designated 75 and 76 which are respectively similar to the bearings 53 and 54 and locking means 55 and 56 above referred to.

More particularly, the bearing 73 is comprised of a pair of relatively rigid complementary parts or portions 77 and the bearing 74 of complementary parts 78. Similarly, the locking means 75 is comprised of a pair of relatively rigid complementary parts or portions 79 and the locking means 76 of complementary parts 80. The parts 79 and 80 of the locking means are provided with locking portions or fingers 81. Otherwise expressed, the bearings and locking means are split or spaced apart. Accordingly, since the complementary parts of each bearing and each locking means are not directly joined or connected the wall 72 of arbor section may yield or flex along its longitudinal medial portion 82 so that the complementary parts on one half of the section may move relative to their complementary parts on the other half of the section in a plane substantially transverse to the longitudinal axis of the section. When either of the arbor sections is applied to a spool shaft, such as 83, the holding or locking fingers 81 on the locking means will spread apart and then yieldably embrace the shaft.

The complementary parts of the locking means 55 and 56 are formed with substantially true arcuate bearing surfaces as in the first embodiment but if found desirable may be formed with clearance as in the second embodiment. The complementary parts of the bearings 53 and 54 also spread apart when the arbor sections are being connected and disconnected from the shaft and have arcuate bearing surfaces.

Each of the arbor sections 70 and 71 is provided with a radial center portion 84 having a projection 85 which fits into a conventional line receiving hole 86 provided in the shaft. Each section is also provided with tubular enlargements 87 for receiving a line 88 and with bevelled marginal edges for the purposes described above. If found desirable, the center portion and enlargements may be joined by transverse reenforcing webs and the complementary parts of each locking means and an adjacent complementary part of a bearing may be reenforced by a longitudinal web to impart stability to the structure without affecting the flexing of portion 82.

With this novel arrangement the arbor sections can be readily snapped onto and off the shaft as desired. As stated above, the wall of each of the arbor sections of this embodiment is formed to yield so that the locking means will embrace the shaft whereas in the first and second embodiments the wall is relatively rigid and the locking means themselves are yieldable or flexible. It is therefore manifest that the invention contemplates utilizing the structure disclosed, including others, for effecting a satisfactory detachable connection between arbor sections and a part of a spool such as the shaft thereof.

While the foregoing description has been given in detail, it is not the intention to thereby restrict the scope of the invention beyond that defined in the appended claims, since the inventive principles thereof are capable of assuming other physical improvements than those herein above described.

I claim:

1. An arbor section for a fishing reel spool having an external line supporting portion and inner formations, each of said formations being split to form a pair of complementary bearing portions shaped to engage the spool, and means spaced axially from the formations and integral with the line supporting portion and located inwardly therefrom for embracing and contacting a part of the spool for detachably securing the section thereto.

2. An arbor section for a fishing reel spool, said section having a line supporting portion, a bearing portion integral with the line supporting portion located inwardly therefrom, each of said formations being split to form a pair of complementary bearing portions shaped to engage a part of the spool, means carried by the bearing portions for embracing and contacting the part for detachably securing the section thereto, and means on the section adapted to cooperate with the spool in a manner whereby to prevent relative rotation between the section and the spool when the section is applied thereto.

3. A moulded plastic arbor section for a fishing reel spool, said section having an arcuate line supporting portion, a pair of formations integral with the line supporting portion extending radially inward therefrom, each of said formations being divided to provide a pair of complementary individual bearing portions shaped to engage a part of the spool, said radial formations being spaced unequally from the ends of the section, fingers carried by the bearing portions for embracing and contacting the part for detachably securing the section thereto, said section also having an internal structure, and means extending from the structure for keying the section to the spool.

4. A pair of complementary arbor sections for attachment to a fishing reel spool, each of said sections having a semi-cylindrical line supporting portion and a pair of internal split bearings shaped to engage the spool, and means spaced from the bearings for gripping a part of the spool to form an arbor about the spool.

5. A pair of elongated complementary arbor sections for attachment to a rotatable member, each of said sections having an external material supporting portion, a pair of internal bearings shaped to engage the member, and a pair of integral internal locking means spaced from one another and the bearings, the material supporting portion of each section having a longitudinal linear yieldable portion located midway between the locking means, the yieldable portion and the space between the locking means on each section being such that the yieldable portion will yield and the locking means will spread apart when the sections are applied to a member having a cross-sectional dimension greater than the space between the locking means.

6. A moulded one-piece arbor section for a fishing reel spool having a shaft, said section having a pair of longitudinally spaced inner bearing portions shaped to engage the spool shaft and an external arcuate line supporting portion, two pairs of flexible members integral with the line supporting portion and located inwardly therefrom for yieldably embracing and contacting the spool shaft for detachably securing the section thereto, said longitudinally spaced bearing portions being disposed inwardly from the ends of the section and on opposite sides of one pair of flexible members, means on the section for keying the section to the shaft, and said arcuate portion being provided with a hole extending therethrough in a non-intersecting direction with respect to the longitudinal axis of the section for receiving a fish line.

7. In combination: a fishing reel spool having a shaft, a moulded one-piece arbor section having longitudinally spaced internally projecting bearing portions engaging the spool and an external arcuate line supporting portion, a pair of flexible members disposed between said bearing portions, said members being integral with the line supporting portion and located inwardly therefrom yieldably embracing and contacting a part of the spool detachably securing the section thereto, means on the section and shaft keying the section to the shaft, and said arcuate portion being provided with a hole extending therethrough in a non-intersecting direction with respect to the longitudinal axis of the section for receiving a fish line.

8. A moulded section for a fishing reel spool having a shaft, said section having an arcuate line supporting portion, two pairs of internal means integral with the line supporting portion located inwardly therefrom and shaped to engage a part of the spool, the line supporting portion between each pair of internal means being flexible, a member carried by each of the internal means arranged for yieldably embracing and contacting the shaft for detachably securing the section thereto, bearing means on the section for engaging a part of a spool, said bearing means being disposed inwardly from the ends of the section and on opposite sides of one pair of said internal means, means on the section for keying the section to the shaft, and said arcuate line supporting portion being provided with a hole extending therethrough in a non-intersecting direction with respect to the longitudinal axis of the section for receiving a fish line.

9. A moulded plastic arbor section for a fishing reel spool, said section having an arcuate line supporting portion, a pair of formations integral with the line supporting portion extending radially inward therefrom and shaped to engage a part of the spool, said radial formations being spaced unequally from the ends of the section and formed so they may be moved relative to one another, fingers carried by the formations for embracing and contacting the part for detachably securing the section thereto, said section also having an internal structure, and means extending from the structure for keying the section to the spool.

10. In combination: a fishing reel spool having a shaft, an arbor section having an arcuate line supporting portion, two pairs of portions integral with the line supporting portion located inwardly therefrom and engaging a part of the spool, each pair of portions being relatively movable and provided with members embracing and contacting the shaft detachably securing the section thereto, means on the section and shaft for keying the section to the shaft, and said arcuate line supporting portion being provided with a hole extending therethrough in a non-intersecting direction with respect to the longitudinal axis of the section for receiving a fish line.

11. In combination: a fishing reel spool, a moulded plastic arbor section having a line supporting portion, a pair of outwardly movable portions integral with the line supporting portion extending radially inward therefrom and shaped to engage a part of the spool, said movable portions being spaced unequally from the ends of the section, fingers carried by the movable portions for embracing and contacting the part for detachably securing the section thereto, said section also having an internal structure for said supporting portion, and means extending from the structure for keying the section to the spool.

12. In combination, a reel having a shaft, a pair of complementary moulded arbor sections, each of said sections having an outer semi-cylindrical material supporting portion and a pair of relatively movable inner bearing formations engaging the shaft, each of said formations being provided with locking means detachably securing the sections about the shaft to form an arbor therefor, and a hole provided in each of said sections, said holes having their axes aligned to provide a chordal passageway through the sections through which material can be inserted to attach the material to the sections.

13. In combination: a reel having a shaft provided with abutment means, a pair of complementary arbor sections, each of said sections having a material supporting portion and a pair of longitudinally spaced internal bearings engaging the shaft, each of said sections being provided with integral locking means located between the bearings detachably securing the sections about the shaft to form an arbor therefor, means interconnecting the sections with the abutment means preventing relative rotational movement between the sections and shaft, and a hole provided in each of the sections, the holes in the sections having their axes aligned to provide a chordal passageway through the sections through which material can be inserted to attach the material to the sections.

14. A pair of complementary arbor sections shaped to form an arbor about a shaft, each of said sections being substantially semi-cylindrical and having an outer line supporting wall and an internal bearing portion shaped to engage a shaft, the line supporting wall along the medial line of each section being flexible, and a hole provided in the wall of each section, each hole being located in the same relative position in each section, the arrangement being such that when the bearing portions of the sections are brought into proper engagement with a shaft the holes will be aligned to provide a chordal passageway so that a line can be inserted through both holes in a manner to attach a line to the sections.

15. A pair of complementary arbor sections shaped to form an arbor about a shaft spool, each of said sections being substantially semi-cylindrical and having an outer line supporting wall and an internal bearing portion shaped to engage a part of a spool, the line supporting wall along the medial line of each section being flexible, and a pair of holes provided in the wall of each section, the pair of holes in one section being located in the same relative positions as in the other section, the arrangement being such that when the bearing portions of the sections are brought into proper engagement with the spool part the holes will be aligned to provide a pair of chordal passageways so that a line can be inserted through one or both passageways in a manner to assist in securing a line to the sections.

16. A pair of complementary moulded plastic arbor sections for a fishing reel spool, each of said sections having an arcuate line supporting portion and a pair of portions integral with the line supporting portion extending radially inward therefrom and shaped to engage a part of the spool, the line supporting wall along the medial line of each section being flexible, said radial portions being spaced unequally from the ends of each section, fingers carried by the radial portions on each section for yieldably embracing and contacting the part for detachably securing the sections thereto so that the arcuate supporting portions will form a substantially uniform cylindrical surface extending throughout the lengths of the sections, each of said sections also having an internal structure, and means extending from the structure of each section for keying the sections to the spool.

17. In combination, a reel having a shaft, a pair of complementary moulded arbor sections, each of said sections having an outer semi-cylindrical material supporting portion and two pairs of inner bearing formations engaging the shaft, each of said bearing formations being provided with locking means detachably securing the sections about the shaft to form an arbor therefor, the locking means on one section being substantially identical to the locking means on the other section and a tubular formation integral with each section and extending entirely therethrough in a non-intersecting direction with respect to the longitudinal axis of the section so that a material may be inserted through either or both tubular formations to assist in attaching the material to one or both sections.

18. A pair of complementary arbor sections for attachment to a shaft, each of said sections having an outer material supporting portion and two pairs of longitudinally spaced corresponding internal bearing means for supporting the sections on a shaft, each of said sections also being provided with a pair of bearing portions located between the center of the section and one pair of the internal bearing means offering support for the sections on a shaft, each one of said internal bearing means being provided with a locking component for securing the sections about a shaft to form an arbor therefor, and the pair of locking components on one section being substantially identical in shape and position to the pair of locking components on the other section.

19. A pair of complementary arbor sections for attachment to a spool having a shaft, each of said sections having an outer material supporting portion and internal bearing means for supporting the sections on a shaft, each of said sections also having a pair of internal formations longitudinally spaced from one another and from said bearing means, each of said sections being further provided with two pairs of bearing portions assisting to support the sections on a shaft, each of said formations being provided with a pair of locking components for securing the sections in position about a shaft to form an arbor therefor, said pairs of locking components on one section being substantially identical in shape and position to the pairs of locking components on the other section, and means for keying the sections to a shaft.

20. A pair of moulded complementary arbor sections for attachment to a spool having a shaft, each of said sections having an outer material supporting portion and a central internal bearing means for supporting the sections on a shaft, at least one of said central bearing means providing a support for a key adapted to interengage with an abutment means on a shaft to prevent relative rotation between the sections and the shaft, each of said sections also having internal wall formations longitudinally spaced from one another and from said bearing means, a pair of internal bearing portions provided on each of the sections between the central bearing means and one of the wall formations assisting to support the sections on a shaft, each of said wall formations carrying a locking component disposed substantially in the plane of the wall formation for securing the sections in position about a shaft to form an arbor therefor, and the locking components on one section being substantially identical in shape and position to the locking components on the other section.

21. A pair of complementary arbor sections for attachment to a spool having a shaft, each of said sections having an outer material supporting wall and a pair of longitudinally spaced internal bearing means for supporting the sections on a shaft, each of said sections also being provided with a split bearing means located between the pair of internal bearing means assisting to support the sections on a shaft, each of said internal bearing means having oppositely disposed portions, and each one of said portions being provided with a locking component for securing the sections in position about a shaft to form an arbor therefor, the locking components on the portions of one section being substantially identical in shape and position to the locking components on the other section.

22. A pair of complementary arbor sections for attachment to a spool having a shaft, each of said sections having an outer arcuate material supporting wall and a pair of longitudinally spaced internal bearing means for supporting the sections on a shaft, each of said sections also being provided with split bearing means located between the said pair of internal bearing means assisting to support the sections on a shaft, each one of said internal bearing means being interrupted and provided with a pair of locking components arranged substantially in parallel relation for securing the sections about a shaft to form an arbor therefor, said pairs of locking components on one section being substantially identical in shape and position to the pairs of locking components on the other section, and a material receiving hole extending through the arcuate wall of at least one section in a non-intersecting direction with respect to the longitudinal axis of the section.

23. A pair of complementary arbor sections for attachment to a spool having a shaft, each of said sections having an outer material supporting wall and internal bearing means, said bearing means being interrupted at its center by a space to provide a pair of corresponding surfaces for engaging and supporting the sections on a shaft, each of said sections also having a pair of internal formations longitudinally spaced from one another and from said bearing means, each of said formations having oppositely disposed portions, each of said portions being provided with a locking component for securing the sections about a shaft to form an arbor therefor, and said locking components on the said portions of one section being substantially identical in shape and position to the locking components on the said portions of the other section.

24. A pair of complementary arbor sections for attachment to a spool having a shaft, each of said sections having an outer material supporting portion and a center internal bearing means for supporting the sections on a shaft, said center bearing means providing a support for a key adapted to interengage with abutment means on a shaft to prevent relative rotation between the sections and shaft, each of said sections also having internally projecting wall formations longitudinally spaced from one another and from said bearing means, each of said sections further being provided with a pair of bearings located between the center bearing means and one of said wall formations assisting to support the sections on a shaft, each of said wall formations carrying a locking component disposed substantially in the plane of the wall for securing the sections in position about a shaft to form an arbor therefor, the locking components on one section being substantially identical in shape and position to the locking components on the other section, and tubular formations provided on the sections through which a material may be inserted to assist in attaching the material to the arbor.

25. A pair of complementary arbor sections shaped to form an arbor about a shaft, each of said sections being substantially semi-cylindrical and having an outer line supporting wall and a pair of longitudinally spaced internal radial wall bearings shaped to engage a shaft, each of said sections also being provided with a pair of longitudinally spaced internal wall formations arranged in parallel relation to the bearings, a pair of locking components provided on each of the formations for detachably connecting the sections about a shaft, and a hole provided in the outer wall of each section, each hole being located in the same relative position in each section, the arrangement being such that when the bearing portions of the sections are brought into proper engagement with a shaft the holes will be aligned to provide a chordal passageway so that a line can be inserted through both holes in a manner to attach a line to the sections.

26. A pair of complementary arbor sections shaped to form an arbor about a shaft, each of said sections being substantially semi-cylindrical and having an outer line supporting wall and a pair of longitudinally spaced internal radial wall bearings shaped to engage a shaft, each of said sections also being provided with a pair of longitudinally spaced internal wall formations arranged in parallel relation to the bearings, a pair of locking components provided on each of the formations for detachably connecting the sections about a shaft, the line supporting wall along the medial line of each section being flexible, and a pair of holes provided in the outer wall of each section, the pair of holes in one section being located in the same relative positions as in the other section, the arrangement being such that when the bearing portions of the sections are brought into proper engagement with the spool part the holes will be aligned to provide a pair of chordal passageways so that a line can be inserted through one or both passageways in a manner to assist in securing a line to the sections.

27. A pair of complementary arbor sections for attachment to a spool having a shaft, each of said sections having an outer material supporting portion and a center internal bearing means for supporting the sections on a shaft, each of said sections also having two pairs of internal formations longitudinally spaced from one another and from said center bearing means, each of said sections being further provided with a pair of bearing portions located between the center bearing means and one of said internal formations assisting to support the sections on a shaft, each one of said formations of each pair being provided with a locking component for securing the sections in position about a shaft to form an arbor therefor, and said pairs of locking components on one section being substantially identical in shape and position to the pairs of locking components on the other section.

28. A moulded one-piece arbor section for a fishing reel spool having a shaft, said section having an inner bearing portion shaped to engage the spool shaft and an external arcuate line supporting portion, a pair of flexible members integral with the line supporting portion and located inwardly therefrom for yieldably embracing and contacting the spool shaft for detachably securing the section thereto, means on the section for keying the section to the shaft, and said arcuate portion being provided with a hole extending therethrough in a non-intersecting direction with respect to the longitudinal axis of the section for receiving a fish line.

29. In combination: a fishing reel spool having a shaft, a moulded one-piece arbor section having an inner bearing portion engaging the spool and an external arcuate line supporting portion, a pair of flexible members integral with the line supporting portion and located inwardly therefrom yieldably embracing and contacting a part of the spool detachably securing the section thereto, means on the section and shaft keying the section to the shaft, and said arcuate portion being provided with a hole extending therethrough in a non-intersecting direction with respect to the longitudinal axis of the section for receiving a fish line.

30. A moulded section for a fishing reel spool having a shaft, said section having an arcuate line supporting portion, bearing portions integral with the line supporting portion located inwardly therefrom and shaped to engage a part of the spool, a pair of flexible members carried by each of the bearing portions for yieldably embracing and contacting the shaft for detachably securing the section thereto, means on the section for keying the section to the shaft, and said arcuate line supporting portion being provided with a hole extending therethrough in a non-intersecting direction with respect to the longitudinal axis of the section for receiving a fish line.

31. A moulded plastic arbor section for a fishing reel spool, said section having an arcuate line supporting portion, a pair of bearing portions integral with the line supporting portion extending radially inward therefrom and shaped to engage a part of the spool, said radial bearings being spaced unequally from the ends of the section, fingers carried by the bearing portions for yieldably embracing and contacting the part for detachably securing the section thereto, said section also having an internal reenforcing web structure, and means extending from the web structure for keying the section to the spool.

32. In combination: a fishing reel spool having a shaft, an arbor section having an arcuate line supporting portion, bearing portions integral with the line supporting portion located inwardly therefrom and engaging a part of the spool, a pair of flexible members carried by each of the bearing portions yieldably embracing and contacting the shaft detachably securing the section thereto, means on the section and shaft for keying the section to the shaft, and said arcuate line supporting portion being provided with a hole extending therethrough in a non-intersecting direction with respect to the longitudinal axis of the section for receiving a fish line.

33. In combination: a fishing reel spool, a moulded plastic arbor section having a line supporting portion, a pair of bearing portions integral with the line supporting portion extending radially inward therefrom and shaped to engage a part of the spool, said radial bearings being spaced unequally from the ends of the section, fingers carried by the bearing portions for yieldably embracing and contacting the part for detachably securing the section thereto, said section also having an internal reenforcing structure for said supporting portion, and means extending from the structure for keying the section to the spool.

34. In combination, a reel having a shaft, a pair of complementary moulded arbor sections, each of said sections having an outer semi-cylindrical material supporting portion and a pair of inner bearing formations engaging the shaft, each of said bearing formations being provided with locking means detachably securing the sections about the shaft to form an arbor therefor, and a hole provided in each of said sections, said holes having their axes aligned to provide a chordal passageway through the sections through which material can be inserted to attach the material to the sections.

35. In combination: a reel having a shaft provided with abutment means, a pair of complementary arbor sections, each of said sections having a material supporting portion and an internal bearing engaging the shaft, each of said sections being provided with integral locking means detachably securing the sections about the shaft to form an arbor therefor, means interconnecting the sections with the abutment means preventing relative rotational movement between the sections and shaft, and a hole provided in each of the sections, the holes in the sections having their axes aligned to provide a chordal passageway through the sections through which material can be inserted to attach the material to the sections.

36. A pair of complementary arbor sections shaped to form an arbor about a shaft, each of said sections being substantially semi-cylindrical and having an outer line supporting wall and an internal bearing portion shaped to engage a shaft, and a hole provided in the wall of each section, each hole being located in the same relative position in each section, the arrangement being such that when the bearing portions of the sections are brought into proper engagement with a shaft the holes will be aligned to provide a chordal passageway so that a line can be inserted through both holes in a manner to attach a line to the sections.

37. A pair of complementary arbor sections shaped to form an arbor about a shaft, each of said sections being substantially semi-cylindrical and having an outer line supporting wall and an internal bearing portion shaped to engage a shaft, and a pair of holes provided in the wall of each section, the pair of holes in one section being located in the same relative positions as the holes in the other section, the arrangement being such that when the bearing portions of the sections are brought into proper engagement with a shaft the holes will be aligned to provide a pair of chordal passageways so that a line can be inserted through one or both passageways in a manner to assist in securing a line to the sections.

38. A pair of complementary moulded plastic arbor sections for a fishing reel spool, each of said sections having an arcuate line supporting portion and a pair of bearing portions integral with the line supporting portion extending radially inward therefrom and shaped to engage a part of the spool, said radial bearings being spaced unequally from the ends of each section, fingers carried by the bearing portions on each section for yieldably embracing and contacting the part for detachably securing the sections thereto so that the arcuate supporting portions will form a substantially uniform cylindrical surface extending throughout the full lengths of the sections, each of said sections also having an internal reenforcing web structure, and means extending from the web structure of each section for keying the sections to the spool.

39. In combination, a reel having a shaft, a pair of complementary moulded arbor sections, each of said sections having an outer semi-cylindrical material supporting portion and a pair of inner bearing formations engaging the shaft, each of said bearing formations being provided with locking means moulded integrally with the bearing formations and serving to detachably secure the sections about the shaft to form an arbor therefor, the locking means on one section being substantially identical to the locking means on the other section, and a tubular formation integral with each section and extending substantially entirely therethrough in a non-intersecting direction with respect to the longitudinal axis of the section so that a material may be inserted through either or both tubular formations to assist in attaching the material to one or both sections.

40. A pair of complementary arbor sections for attachment to a spool having a shaft, each of said sections having an outer material supporting portion and a pair of longitudinally spaced internal bearing means for supporting the sections on a shaft, each one of said internal bearing means being provided with a pair of locking components for securing the sections in position about a shaft to form an arbor therefor, and said pairs of locking components on one section being substantially identical in shape and position to the pairs of locking components on the other section.

41. A pair of complementary arbor sections for attachment to a spool having a shaft, each of said sections having an outer material supporting portion and internal bearing means for supporting the sections on a shaft, each of said sections also having a pair of internal formations longitudinally spaced from one another and from said bearing means, each of said formations being provided with a pair of locking components for securing the sections in position about a shaft to form an arbor therefor, and said pairs of locking components on one section being substantially identical in shape and position to the pairs of locking components on the other section.

42. A pair of moulded complementary arbor sections for attachment to a spool having a shaft, each of said sections having an outer material supporting portion and internal bearing means for supporting the sections on a shaft, at least one of said bearing means providing a support for a key adapted to interengage with abutment means on a shaft to prevent relative rotation between the section and the shaft, each of said sections also having internal wall formations longitudinally spaced from one another and from said bearing means, each of said wall formations carrying a locking component disposed substantially in the plane of the wall formation for securing the sections in position about a shaft to form an arbor therefor, and the locking components on one section being substantially identical in shape and position to the locking components on the other section.

43. The structure defined in claim 42, in which the bearing means is located between the wall formations.

44. A pair of complementary arbor sections for attachment to a spool having a shaft, each of said sections having an outer material supporting wall and a pair of longitudinally spaced internal bearing means for supporting the sections on a shaft, each of said internal bearing means having oppositely disposed portions, and each one of said portions being provided with a locking component for securing the sections in position about a shaft to form an arbor therefor, the locking components on the portions of one section being substantially identical in shape and position to the locking components on the portions of the other section.

45. A pair of complementary arbor sections for attachment to a spool having a shaft, each of said sections having an outer arcuate material supporting wall and a pair of longitudinally spaced internal bearing means for supporting the sections on a shaft, each one of said internal bearing means being interrupted and provided with a pair of locking components arranged substantially in parallel relation for securing the sections about a shaft to form an arbor therefor, said pairs of locking components on one section being substantially identical in shape and position to the pairs of locking components on the other section, and a material receiving hole extending through the arcuate wall of at least one section in a non-intersecting direction with respect to the longitudinal axis of the section.

46. A pair of complementary arbor sections for attachment to a spool having a shaft, each of said sections having an outer material supporting wall and internal bearing means for supporting the sections on a shaft, each of said sections also having a pair of internal formations longitudinally spaced from one another and from said bearing means, each of said formations having oppositely disposed portions, each of said portions being provided with a locking component for securing the sections about a shaft to form an arbor therefor, and said locking components on the said portions of one section being substantially identical in shape and position to the locking components on the said portions of the other section.

47. A pair of moulded complementary arbor sections for attachment to a spool having a shaft, each of said sections having an outer material supporting portion and internal bearing means for supporting the sections on a shaft, at least one of said bearing means providing a support for a key adapted to interengage with abutment means on a shaft to prevent relative rotation between the sections and shaft, each of said sections also having internally projecting wall formations longitudinally spaced from one another and from said bearing means, each of said wall formations carrying a locking component disposed substantially in the plane of the wall for securing the sections in position about a hub to form an arbor therefor, the locking components on one section being substantially identical in shape and position to the locking components on the other section, and tubular formations provided on the sections through which a material may be inserted to assist in attaching the material to the arbor.

48. A pair of complementary arbor sections shaped to form an arbor about a shaft, each of said sections being substantially semi-cylindrical and having an outer line supporting wall and an internal bearing portion shaped to engage a shaft, means for securing the sections about a shaft, means for keying the sections to a shaft, and a hole provided in the wall of each section, each hole being located in the same relative position in each section, the arrangement being such that when the bearing portions of the sections are brought into proper engagement with a shaft the holes will be aligned to provide a chordal passageway so that a line can be inserted through both holes in a manner to attach a line to the sections.

49. A pair of complementary arbor sections shaped to form an arbor about a shaft, each of said sections being substantially semi-cylindrical and having an outer line supporting wall and an internal bearing portion shaped to engage a shaft, means for securing the sections about a shaft, means for keying the sections to a shaft, and a pair of holes provided in the wall of each section, the pair of holes in one section being located in the same relative positions as the holes in the other section, the arrangement being such that when the bearing portions of the sections are brought into proper engagement with a shaft the holes will be aligned to provide a pair of chordal passageways so that a line can be inserted through one or both passageways in a manner to assist in securing a line to the sections.

50. A pair of complementary shell-like arbor sections for attachment to a spool having a shaft, each of said sections having an outer material supporting portion provided with a pair of longitudinally spaced internal bearing means for supporting the sections on a shaft, the supporting portion on each section being further provided with a pair of longitudinally spaced formations, a locking component on each of the formations for securing the sections in position about a shaft to form an arbor therefor, the locking components being of predetermined lengths with their axes disposed substantially transverse to the longitudinal axes of the sections, and said locking components on one section being substantially identical in shape and position to the locking components on the other section.

51. A pair of complementary arbor sections for attachment to a spool having a shaft, each of said sections having an outer material supporting portion and a pair of longitudinally spaced internal bearing means for supporting the sections on a shaft, each one of said internal bearing means being provided with a pair of locking components for securing the sections in position about a shaft to form an arbor therefor, means for keying the sections to a shaft, said pairs of locking components on one section being substantially identical in shape and position to the pairs of locking components on the other section, and a material receiving hole provided in each of the sections, the longitudinal axis of each hole being so disposed that it will not intersect the longitudinal axis of the section.

52. A pair of moulded complementary arbor sections for attachment to a spool having a shaft, each of said sections having an outer material supporting portion and internal bearing means for supporting the sections on a shaft, at least one of said bearing means providing a support for a key adapted to interengage with abutment means on a shaft to prevent relative rotation between the sections and the shaft, each of said sections also having internal wall formations longitudinally spaced from one another and from said bearing means, each of said wall formations carrying a pair of locking components integral with the supporting portion of each section and disposed substantially in the plane of the wall formation for securing the sections in position about a shaft to form an arbor therefor, and the pairs of locking components on one section being substantially identical in shape and position to the pairs of locking components on the other section.

53. A pair of complementary arbor sections for attachment to a spool having a shaft, each of said sections having an outer material supporting wall and a pair of longitudinally spaced internal bearing means for supporting the sections on a shaft, each of said internal bearing means having oppositely disposed portions integral with the supporting wall, each one of said portions being provided with a locking component for securing the sections in position about a shaft to form an arbor therefor, the locking components on the portions of one section being substantially identical in shape and position to the locking components on the portions of the other section, and means for keying the sections to a shaft.

MORRIS E. WOOD.

References Cited in the file of this patent

UNITED STATES PATENTS

| Number | Name | Date |
|---|---|---|
| 653,796 | Ettinger | July 17, 1900 |
| 806,064 | Carter | Nov. 28, 1905 |
| 823,401 | Ferris | June 12, 1906 |
| 1,459,772 | Kirsch | June 26, 1923 |
| 1,832,590 | Sponable et al. | Nov. 17, 1931 |
| 1,855,738 | Case | Apr. 26, 1932 |
| 2,033,905 | Kingsley | Mar. 10, 1936 |
| 2,190,013 | Byers | Feb. 13, 1940 |
| 2,336,981 | Clickner | Dec. 14, 1943 |
| 2,344,665 | Adams | Mar. 21, 1944 |